United States Patent
Farha et al.

(10) Patent No.: US 11,380,958 B2
(45) Date of Patent: Jul. 5, 2022

(54) TRACTION BATTERY ENCLOSURE AND LOAD DIRECTING METHOD

(71) Applicant: Ford Global Technologies, LLC, Dearborn, MI (US)

(72) Inventors: Eid Farha, Ypsilanti, MI (US); Himanshu Khandelwal, Warren, MI (US); Jesus Cardoso, Saline, MI (US); Jingmei Shen, Troy, MI (US); Dave Moschet, Dearborn, MI (US); Jeffery Christ, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 276 days.

(21) Appl. No.: 16/736,920

(22) Filed: Jan. 8, 2020

(65) Prior Publication Data

US 2021/0210738 A1 Jul. 8, 2021

(51) Int. Cl.
*H01M 50/20* (2021.01)
*B60L 50/64* (2019.01)

(52) U.S. Cl.
CPC ............. *H01M 50/20* (2021.01); *B60L 50/64* (2019.02); *H01M 2220/20* (2013.01)

(58) Field of Classification Search
CPC .................................................. H01M 50/20
See application file for complete search history.

(56) References Cited

U.S. PATENT DOCUMENTS

| 4,265,984 | A  | * | 5/1981 | Kaye | ................... | H01M 50/213 |
|---|---|---|---|---|---|---|
| | | | | | | 429/178 |
| 2005/0153195 | A1 | * | 7/2005 | Han | ................... | H01M 50/572 |
| | | | | | | 429/59 |
| 2013/0180684 | A1 | * | 7/2013 | Gong | ................ | H01M 10/6551 |
| | | | | | | 165/67 |

FOREIGN PATENT DOCUMENTS

| CN | 204577475 | 8/2015 |
|---|---|---|
| CN | 204760453 | 11/2015 |
| CN | 208093596 | 11/2018 |
| CN | 208955029 | 6/2019 |
| KR | 101381098 | 3/2014 |

* cited by examiner

*Primary Examiner* — Olatunji A Godo
(74) *Attorney, Agent, or Firm* — David B. Kelley; Carlson, Gaskey & Olds, P.C.

(57) ABSTRACT

A battery pack assembly includes, among other things, a first battery component, a different, second battery component and an enclosure that has a cover secured to a tray to provide an interior. The first and second battery components are disposed within the interior. The cover has a first area that is disposed directly above the first battery component. The cover has a second area that is disposed directly above the second battery component. The battery pack assembly further includes a rib of the cover. The rib extends into the interior from the first area. The rib is configured to contact the first battery component to inhibit relative movement of the second area toward the second battery component.

20 Claims, 3 Drawing Sheets

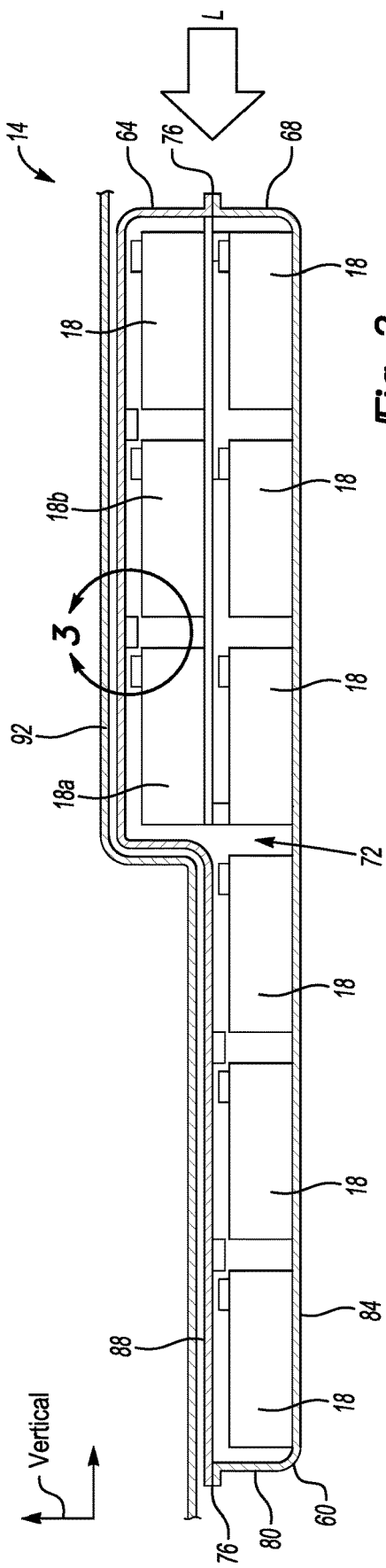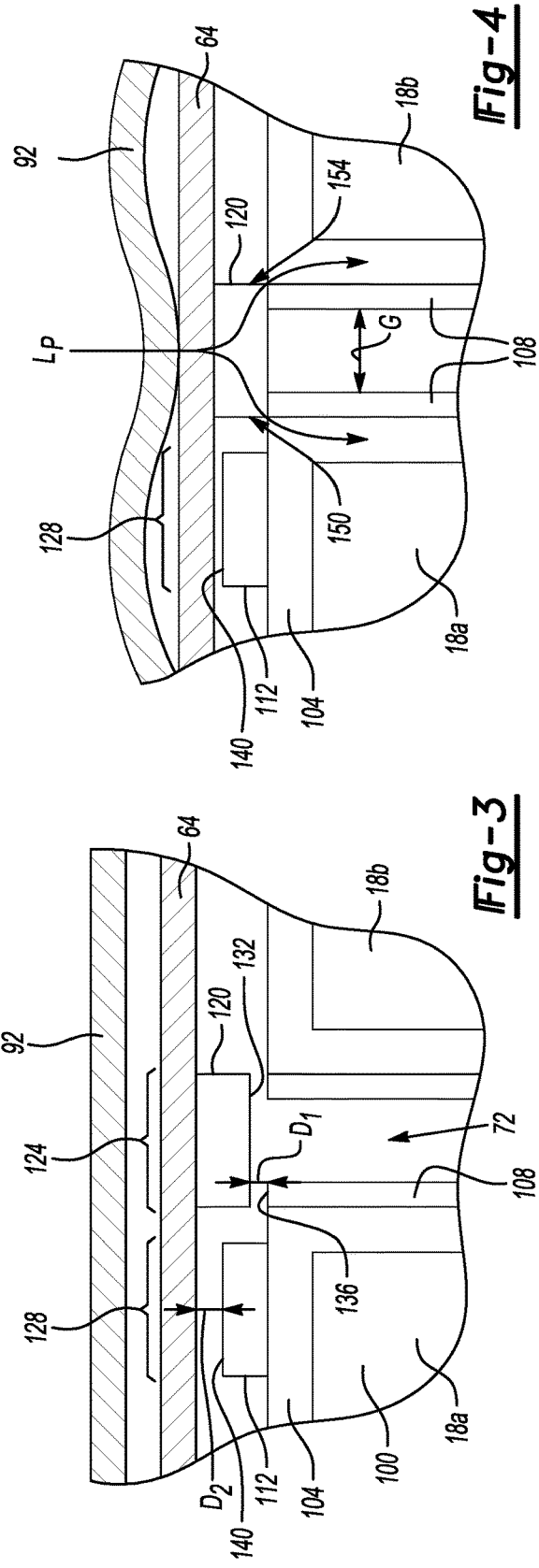

TRACTION BATTERY ENCLOSURE AND LOAD DIRECTING METHOD

TECHNICAL FIELD

This disclosure relates to an enclosure for a traction battery of an electrified vehicle. The enclosure incorporates, among other things, ribs used to direct a load path.

BACKGROUND

Electrified vehicles differ from conventional motor vehicles because electrified vehicles can be driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

SUMMARY

A battery pack assembly according to an exemplary aspect of the present disclosure includes, among other things, a first battery component, a different, second battery component and an enclosure that has a cover secured to a tray to provide an interior. The first and second battery components are disposed within the interior. The cover has a first area that is disposed directly above the first battery component. The cover has a second area that is disposed directly above the second battery component. The battery pack assembly further includes a rib of the cover. The rib extends into the interior from the first area. The rib is configured to contact the first battery component to inhibit relative movement of the second area toward the second battery component.

In another example of the foregoing battery pack assembly, the rib is configured to contact the first battery component after relative movement of the first area and the rib toward the first battery component.

In another example of any of the foregoing battery pack assemblies, the rib extends vertically downward from the first area of the cover.

In another example of any of the foregoing battery pack assemblies, the cover is secured to the tray at an interface that extends circumferentially continuously about a perimeter of the enclosure. The rib is spaced a distance from the perimeter.

In another example of any of the foregoing battery pack assemblies, the second battery component extends vertically past a vertically uppermost surface of the first component.

In another example of any of the foregoing battery pack assemblies, the first and second battery components are components of a common battery array.

In another example of any of the foregoing battery pack assemblies, the first battery component is a side plate of a battery array.

In another example of any of the foregoing battery pack assemblies, the second battery component is a sense lead connector assembly of a battery array.

In another example of any of the foregoing battery pack assemblies, the rib inhibits the relative movement of the second area toward the sense lead connector by contacting the first battery component to direct a load around the sense lead assembly.

In another example of any of the foregoing battery pack assemblies, a first horizontal end portion of the rib is configured to contact the first battery component of a first battery array. An opposite second horizontal end portion of the rib is configured to contact a battery component of a second battery array.

In another example of any of the foregoing battery pack assemblies, the rib spans across a gap between the first battery array and the second battery array when the first horizontal end portion of the rib is contacting the first battery component of the first battery array and when the second horizontal end portion of the rib is contacting the battery component of the second battery array.

In another example of any of the foregoing battery pack assemblies, the rib, the first area, and the second area are portions of the same continuous and monolithic cover.

In another example of any of the foregoing battery pack assemblies, the cover is a sheet molded compound.

In another example of any of the foregoing battery pack assemblies, the rib is a first rib. The assembly further includes at least one second rib that extends into the interior from the first area. The at least one second rib is configured to contact the first battery component or a third battery component to inhibit relative movement of the second area toward the second battery component. The third battery component is different than both the first and the second battery components.

A battery pack assembly according to an exemplary aspect of the present disclosure includes, among other things, a battery array that has a sense lead connector assembly and a plurality of battery assemblies. The sense lead connector assembly is disposed within the battery at a position that is vertically above the plurality of battery assemblies. The battery pack assembly also includes a cover of an enclosure and a tray of the enclosure. The tray is secured to the cover to provide an interior that houses the battery array. The enclosure is disposed vertically beneath a floor of a vehicle. The battery pack assembly further includes at least one rib of the cover that contacts a component of the battery array other than the sense lead connector assembly to direct a load around the sense lead assembly.

In another example of any of the foregoing battery pack assemblies, the load is a load applied to the vehicle that causes the floor of the vehicle to buckle and move the enclosure cover relatively closer to the battery array.

In another example of any of the foregoing battery pack assemblies, the at least one rib extends vertically downward from the cover into the interior. The cover is secured to the tray at an interface that extends circumferentially continuously about a perimeter of the enclosure. The at least one rib is spaced a distance from the perimeter.

A load directing method according to another exemplary aspect of the present disclosure includes, among other things, applying a load to a vehicle having an enclosure that houses at least one battery array within an interior. The enclosure includes a tray and a cover secured to the tray to provide the interior. The load directing method further includes directing the load along a load path that extends directly between at least one rib of the cover and a first battery component of the at least one battery array to inhibit the load path from extending through a second battery component of the at least one battery array.

In another example of the foregoing load directing method, the at least one rib extends vertically downward from the cover.

In another example of any of the foregoing load directing methods, the second component is a sense lead connector assembly of the at least one battery array.

BRIEF DESCRIPTION OF THE FIGURES

The various features and advantages of the disclosed examples will become apparent to those skilled in the art from the detailed description. The figures that accompany the detailed description can be briefly described as follows:

FIG. 2 illustrates a section side view of a battery pack from the powertrain of FIG. 1.

FIG. 3 illustrates a close-up view of an area shown in FIG. 2.

FIG. 4 illustrates a close-up view of the area of FIG. 3 after a load applied to a vehicle having the battery pack has moved a floor of the vehicle relative to the battery pack.

DETAILED DESCRIPTION

This disclosure relates to a traction battery enclosure of an electrified vehicle. The enclosure includes at least one rib. If a load is applied to the electrified vehicle, the rib can help to direct a load path of the load away from certain components housed within the traction battery enclosure, especially relatively sensitive components such as sense lead connector assemblies. These and other features are discussed in detail in the following paragraphs of this detailed description.

Figure 1:
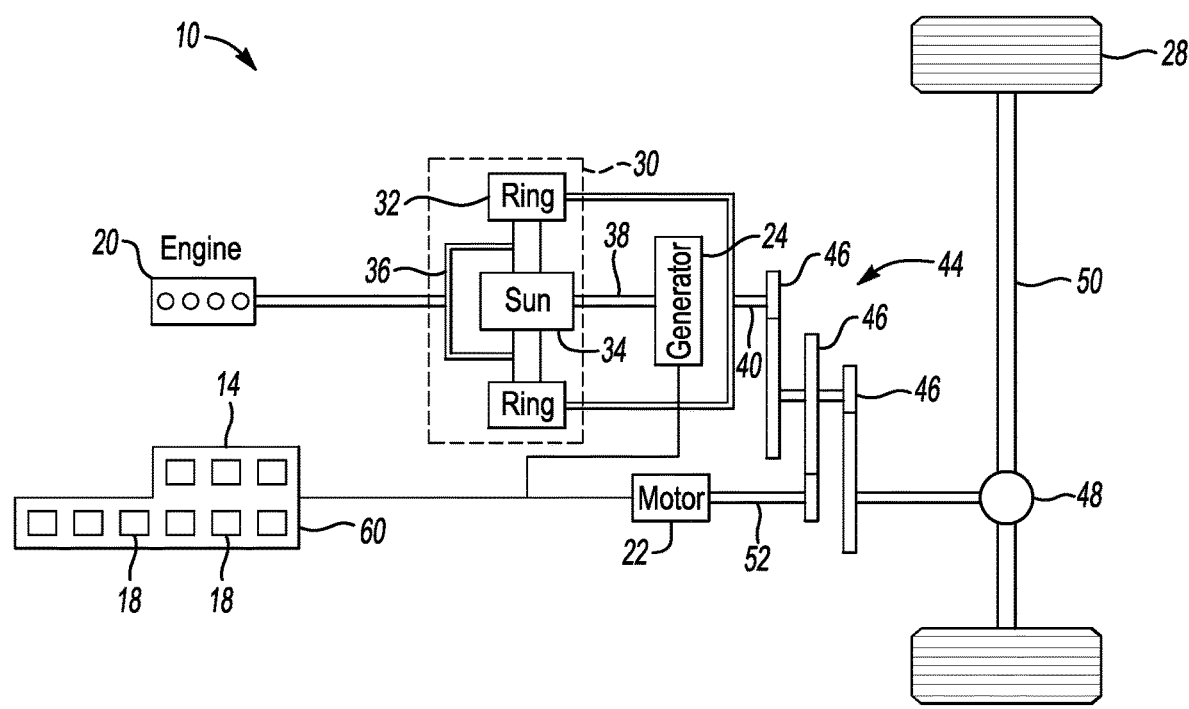
FIG. 1 illustrates a schematic view of an example powertrain for an electrified vehicle.

FIG. 1 schematically illustrates a powertrain 10 for an electrified vehicle. Although depicted as a hybrid electric vehicle (HEV), it should be understood that the concepts described herein are not limited to HEVs and could extend to any other type of electrified vehicle, including, but not limited to, plug-in hybrid electric vehicles (PHEVs), battery electric vehicles (BEVs), fuel cell vehicles, etc.

The powertrain 10 includes a battery pack 14 having a plurality of battery arrays 18, an internal combustion engine 20, a motor 22, and a generator 24. The motor 22 and the generator 24 are types of electric machines. The motor 22 and generator 24 may be separate or have the form of a combined motor-generator. In another embodiment, the battery pack 14 is used in connection with the BEV architecture rather than the depicted HEV.

In this embodiment, the powertrain 10 is a power-split powertrain that employs a first drive system and a second drive system. The first and second drive systems generate torque to drive one or more sets of vehicle drive wheels 28. The first drive system includes a combination of the engine 20 and the generator 24. The second drive system includes at least the motor 22, the generator 24, and the battery pack 14. The motor 22 and the generator 24 are portions of an electric drive system of the powertrain 10.

The engine 20 and the generator 24 can be connected through a power transfer unit 30, such as a planetary gear set. Of course, other types of power transfer units, including other gear sets and transmissions, can be used to connect the engine 20 to the generator 24. In one non-limiting embodiment, the power transfer unit 30 is a planetary gear set that includes a ring gear 32, a sun gear 34, and a carrier assembly 36.

The generator 24 can be driven by the engine 20 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 can be selectively employed to drive the vehicle drive wheels 28 by outputting torque to a shaft 52 that is also connected to the second power transfer unit 44. In this embodiment, the motor 22 and the generator 24 cooperate as part of a regenerative braking system in which both the motor 22 and the generator 24 can be employed as motors to output torque. For example, the motor 22 and the generator 24 can each output electrical power to recharge cells of the battery pack 14.

Referring now to FIG. 2 with continued reference to FIG. 1, the battery pack 14 includes an enclosure 60 that houses the plurality of battery arrays 18. In the exemplary embodiment, the enclosure 60 includes a cover 64 secured to a tray 68 to provide an interior 72. The battery arrays 18 are disposed within the interior 72 when the battery arrays 18 are housed by the enclosure 60.

In the exemplary embodiment, the battery arrays 18 are arranged in multiple tiers. In particular, six of the battery arrays 18 are disposed on a lower tier, and three of the battery arrays 18 are disposed on an upper tier that is vertically above the lower tier. Vertical and horizontal, for purposes of this disclosure, are with reference to ground and a general orientation of the battery pack 14 when installed within the vehicle.

The cover 64 of the enclosure 60 is polymer-based, such as a thermoplastic-based. In a specific example, the cover 64 is a sheet molded compound (SMC) material. The cover 64 can include reinforcing fibers, such as glass or carbon, or other fillers such as talc or glass beads. The tray 68 can be aluminum, or some other type of material.

The tray 68 is hermetically sealed to the cover at an interface 76. The interface extends circumferentially continuously about a perimeter of the enclosure 60.

The enclosure 60 has a plurality of horizontally facing sides 80 extending from a vertically bottom side 84 of the enclosure 60 to a vertically top side 88 of the enclosure 60. In the exemplary embodiment, the tray 68 provides the vertically bottom side 84 and a portion of the horizontally facing sides 80. The cover 64 provides another portion of the horizontally facing sides 80, and the vertically top side 88.

The enclosure 60 is disposed vertically beneath a floor 92 of a vehicle when the battery pack 14 is in an installed position within the vehicle. Straps, mechanical fasteners, and other structures (not shown) can be used to hold the battery pack 14 in the installed position vertically beneath the floor 92. The vehicle floor can be metal or a metal alloy material.

From time to time, a load L, such as load due to a rear impact, may be directed into the vehicle. The load L can move along a load path that extends through structures of the vehicle such as portions of the floor 92 that are vertically above the battery pack 14. In this example, the load L causes the floor 92 to buckle. FIG. 3 shows a portion of the floor 92 and a portion of the battery pack 14 prior the load L being directed into the vehicle. FIG. 4 shows the floor 92 and portion of the battery pack 14 after the load L has been directed into the vehicle.

The buckling of the floor 92, in the exemplary embodiment, causes the floor 92 to move relative to the cover 64 of the enclosure 60. Movement of the cover 64 can cause the cover 64 to contact components held within the interior 72 and thus the load path to extend into components held within the interior 72, such as the battery arrays 18. The enclosure 60 of the exemplary battery pack 14, and particularly the cover 64 of the enclosure 60, includes features utilized to direct the load along a load path that extends away from certain areas of the battery arrays 18.

The battery arrays 18a and 18b shown in FIGS. 3 and 4 include, among other things, battery cells 100 held within frames 104. Side plates 108 are disposed along the laterally outer peripheries of the battery arrays 18.

Each of the battery arrays 18a and 18b includes a sense lead connector assembly 112 mounted atop the frames 104. The sense lead connector assembly 112 is, in this example a Hot-At-All-Time (HAAT) sense lead connector. Sense leads can be coupled to the battery array 18a through the sense lead connector assembly 112. The sense leads can help to monitor temperature, voltage of the battery array 18. Wires can operably couple the sense lead connector assembly 112 to a controller module of the vehicle, such as a Battery Pack Control Module.

FIGS. 3 and 4 show the sense lead connector assembly 112 of the battery array 18a, but not the sense lead connector assembly of the battery array 18b. The battery cells 100, the frames 104, the side plates 108, and the sense lead connector assembly 112 are all components of the battery arrays 18a and 18b. The battery arrays 18a and 18b also include other components.

The sense lead connector assembly 112, due to its position vertically atop the frames 104, extends vertically upward further than the other components of the battery array 18a. In the exemplary embodiment, the sense lead connector assembly 112 extends vertically above the side plate 108 of the battery array 18a, and is disposed within the battery pack 14 vertically higher than both the frames 104 and the battery cells 100. Placing the sense lead connector 112 at this position can, among other things, facilitate assembly.

In the past, sense lead connector assemblies have been recessed within a battery array such that the sense lead connector assemblies were not vertically proud of other portions of the battery array.

The cover 64 of the enclosure 60 includes a plurality of ribs 120. In the exemplary embodiment, the ribs 120 extend vertically downward from the first area 124 of the cover. At least a portion of the first area 124 is directly vertically above the side plate 108 of the battery array 18a. Accordingly, the rib 120 is also directly vertically above the side plate 108 of the battery array 18a.

The cover 64 of the enclosure 60 further includes a second area 128 that is directly vertically above the sense lead connector assembly 112. The second area 128 lacks the rib 120 extending into the interior 72 of the enclosure 60. That is, the exemplary rib 120 does not extend from the second area 128.

Prior to application of the load L, the battery pack 14 is configured such that a distance $D_1$ between a downwardly facing surface 132 of the rib 120 and an uppermost surface 136 of the side plate 108 of the battery array 18a is less than a distance $D_2$. The distance $D_2$ represents the distance between the second area of the cover 64 and a vertically uppermost surface 140 of the sense lead connector assembly 112.

This configuration, among other things, causes the rib 120 to directly contacting the side plate 108 of the battery array 18a when the floor 92 buckles and causes sufficient movement of the cover 64 toward the battery array 18a. The direct contact between the rib 120 and the side plate 108 occurs before the second area 128 of the cover 64 contacts the vertically upper surface 140 of the sense lead connector assembly 112.

The direct contact between the rib 120 and the side plate 108 directs the load L along a load path $L_p$ that transfers at least some of the load L directly from the rib 120 of the cover 64 to the side plate 108 of the battery array 18a. This inhibits the load path from extending from the second area 128 of the cover 64 to the sense lead connector assembly 112.

Although the example rib 120 is configured to transfer at least some of the load L to the side plate 108, the rib 120 could be configured to direct the load to some other structural component of the battery array 18a.

The contact between the rib 120 and the side plate 108 effectively inhibits relative movement of the second area 128 toward the sense lead connector assembly 112 due to the buckling of the floor 92. In this example, the side plate 108 and other components of the battery array 18a may be better able to withstand loads than the sense lead connector 112. Inhibiting movement of the second area 128, and other portions of the enclosure 60 toward the vehicle sense lead connector assembly 112, can help to avoid the second area 128 touching down onto the vehicle sense lead connector assembly 112, which could result in load being transferred to the vehicle sense lead connector assembly 112. This can help to maintain the integrity of the vehicle sense lead 112 when the load L is applied to the vehicle.

The rib 120 is used to inhibit load transfer to the sense lead connector 112 in this example. The sense lead connector 112 is a battery component that is often considered a relatively sensitive battery component when compared to other components, such as the side plate 108. Accordingly, avoiding or inhibiting loads being applied to the sense lead connector 112 can be desirable. The rib 120 could be used to inhibit load transfer to other types of components in other examples. For example, inhibiting a transfer of load to battery components such as a high voltage terminal, a high voltage buss, high voltage wiring, or wiring associated with the sense lead connector 112 may be desirable.

In the exemplary embodiment, the rib 120 has a first horizontal end portion 150 that directly contacts the side plate 108 of the array 18a after sufficient movement of the rib 120 relative to the side plate 108. The rib 120 further includes an opposite, second horizontal end portion 154 that contacts a side plate 108 of the adjacent array 18b after sufficient relative movement of the rib 120.

When the rib 120 contacts the side plate 108 of the array 18a and the side plate 108 of the array 18b, the load path $L_p$ then transfers load from the rib 120 of the cover into both side plates 108. When the rib 120 is contacting the side plate 108 of the array 18a and the side plate 108 of the array 18b as shown in FIG. 4, the rib 120 spans a gap G between the side plate 108 of the battery array 18a and the side plate 108 of the battery array 18b.

The rib 120 is a continuous monolithic portion of the cover 64 in the exemplary embodiment. The sheet molded compound material that provides the rib 120 is utilized to provide the remaining portions of the cover 64. Forming the rib 120 together with the remaining portions of the cover 64 can simplify manufacturing.

Figure 5:
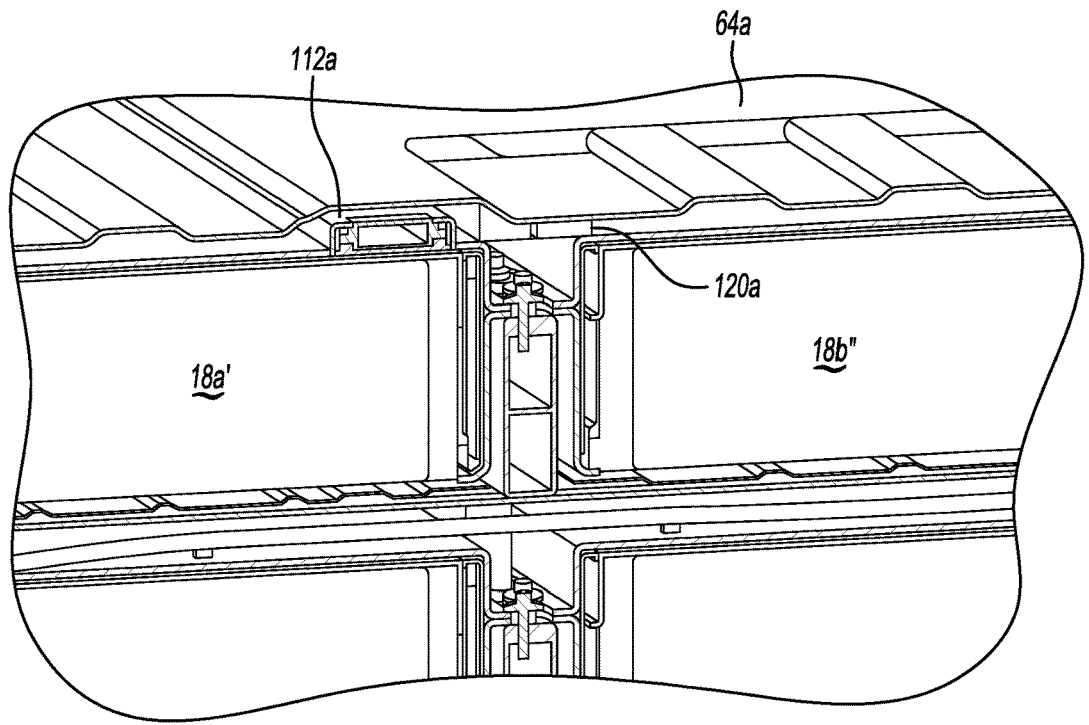
FIG. 5 illustrates a section view of a portion of a battery pack according to another exemplary embodiment of the present disclosure.

With reference now to FIG. 5, another example cover 64a includes a rib 120a configured to contact battery components, here side plates of battery arrays 18a' and 18b', to direct a load around another battery component, here a sense lead connector assembly 112a. In the exemplary embodiment, the cover 64a is formed with various corrugations, which can help to strengthen the cover 64a.

Notably, a vertical distance between the rib 120 and the side plates of the arrays 18a' and 18b' is less than a distance between the sense lead connector assembly 112a and the portions of the cover 64a vertically directly above the sense lead connector assembly 112a. Thus, a buckling movement of a floor (not shown in FIG. 5) causing the cover 64a to move toward the battery arrays 18a' and 18b' will result in the rib 120a contacting the side plates of the arrays 18a' and 18b' prior to other portions of the cover 64a contacting the sense lead connector assembly 112a.

The rib 120a could be designed to have a gap relative to the side plates of the battery arrays 18a' and 18b' prior to application of the load. In another example, the rib 120a could be designed to directly contact the side plates of the arrays 18a' and 18b' prior to application of the load.

Figure 6:
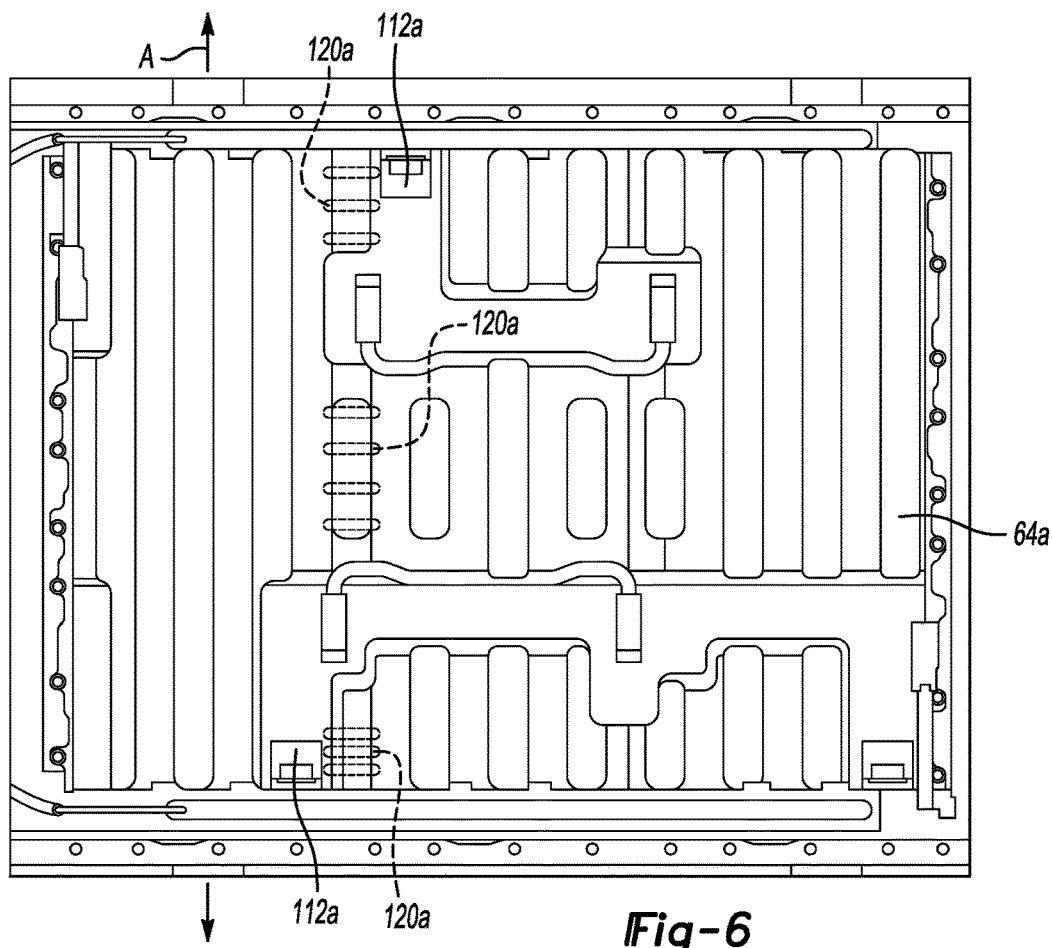
FIG. 6 illustrates a top view of a portion of the battery pack of FIG. 5.

Referring to FIG. 6, the cover 64a may include groupings of the ribs 120a. The arrays 18a' and 18b' can have battery cells 100 and frames 104 (not shown) distributed along an array axis A. The groupings of the ribs 120a can be disposed along an axis aligned with, and spaced from, the array axis A. The groupings of the ribs 120a can be concentrated in areas containing the sense lead assemblies 112a of the arrays.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A battery pack assembly, comprising:
   a first battery component of a battery array;
   a different, second battery component of the battery array, the second battery component a sense lead connector assembly of the battery array;
   an enclosure having a cover secured to a tray to provide an interior, the first and second battery components disposed within the interior, the cover having a first area that is disposed directly above the first battery component, the cover having a second area that is disposed directly above the second battery component; and
   a rib of the cover, the rib extending into the interior from the first area, the rib configured to contact the first battery component to inhibit relative movement of the second area toward the second battery component.

2. The battery pack assembly of claim 1, wherein the rib is spaced a distance away from the first battery component and is configured to contact the first battery component after relative movement of the first area and the rib toward the first battery component.

3. The battery pack assembly of claim 1, wherein the rib extends vertically downward from the first area of the cover.

4. The battery pack assembly of claim 1, wherein the cover is secured to the tray at an interface that extends circumferentially continuously about a perimeter of the enclosure, wherein an entirety of the rib is spaced a distance from the interface.

5. The battery pack assembly of claim 1, wherein the second battery component extends vertically past a vertically uppermost surface of the first component.

6. The battery pack assembly of claim 5, wherein the first and second battery components are components of a common battery array.

7. The battery pack assembly of claim 1, wherein the first battery component is a side plate of a battery array, the rib spaced a distance away from the side plate and configured to contact the side plate after relative movement of the first area and the rib toward the side plate.

8. The battery pack assembly of claim 1, wherein the rib inhibits the relative movement of the second area toward the sense lead connector by contacting the first battery component to direct a load around the sense lead assembly.

9. The battery pack assembly of claim 1, wherein a first horizontal end portion of the rib is configured to contact the first battery component of a first battery array, and an opposite second horizontal end portion of the rib is configured to contact a battery component of a second battery array.

10. The battery pack assembly of claim 9, wherein the rib spans across a gap between the first battery array and the second battery array when the first horizontal end portion of the rib is contacting the first battery component of the first battery array and when the second horizontal end portion of the rib is contacting the battery component of the second battery array.

11. The battery pack assembly of claim 1, wherein the rib, the first area, and the second area are portions of the same continuous and monolithic cover.

12. The battery pack assembly of claim 1, wherein the cover is a sheet molded compound.

13. The battery pack assembly of claim 1, wherein the rib is a first rib, and further comprising at least one second rib extending into the interior from the first area, the at least one second rib configured to contact the first battery component or a third battery component to inhibit relative movement of the second area toward the second battery component, the third battery component different than both the first and the second battery components.

14. A battery pack assembly, comprising:
    a battery array having a sense lead connector assembly and a plurality of battery assemblies, the sense lead connector assembly disposed within the battery array at a position that is vertically above the plurality of battery assemblies;
    a cover of an enclosure;
    a tray of the enclosure, the tray secured to the cover to provide an interior that houses the battery array, the enclosure disposed vertically beneath a floor of a vehicle; and
    at least one rib of the cover that contacts a component of the battery array other than the sense lead connector assembly to direct a load around the sense lead connector assembly.

15. The battery pack assembly of claim 14, wherein the load is a load applied to the vehicle that causes the floor of the vehicle to buckle and move the enclosure cover relatively closer to the battery array.

16. The battery pack assembly of claim 15, wherein the at least one rib extends vertically downward from the cover into the interior, wherein the cover is secured to the tray at an interface that extends circumferentially continuously about a perimeter of the enclosure, wherein all portions of the at least one rib are spaced a distance from the interface.

17. A battery pack assembly of an electrified vehicle, comprising:
   first and second battery arrays each having a plurality of battery cells and a sense lead connector assembly, the first battery array spaced a distance from all portions the second battery array;
   an enclosure having a tray and a cover, the tray secured to the cover to provide an interior that houses the first and second battery array; and
   a rib of the cover, the rib disposed vertically above the first battery array, the rib spaced a distance from all portions of the first and second battery arrays, the rib configured to move to contact a component of the first battery array other than the sense lead connector assembly of the first battery array to direct a load around the sense lead connector assembly of the first battery array.

18. The battery pack assembly of claim 17, wherein the battery cells are held within respective frames, wherein the sense lead connector assemblies are disposed vertically above the frames.

19. The battery pack assembly of claim 17, wherein the load is a load applied to the vehicle that causes a floor of the vehicle to buckle and move the enclosure cover relatively closer to the battery array.

20. The battery pack assembly of claim 19, wherein the first and second battery arrays are spaced from each other to provide a gap, wherein the rib is configured to move to contact the component of the second battery array other than the sense lead connector assembly of the second battery array to direct the load around the sense lead connector assembly of the second battery array.

* * * * *